United States Patent

Schmitz

[11] 4,204,478
[45] May 27, 1980

[54] TRANSPORTATION VEHICLE FLAT TIRE SAFETY APPARATUS

[75] Inventor: William E. Schmitz, Wilkinsburg, Pa.

[73] Assignee: Westinghouse Electric Corp., Pittsburgh, Pa.

[21] Appl. No.: 897,326

[22] Filed: Apr. 18, 1978

[51] Int. Cl.² .............................................. B61B 15/00
[52] U.S. Cl. ................................. 104/247; 116/34 R; 116/DIG. 27; 246/171; 301/39 T
[58] Field of Search .............. 104/246, 247; 301/39 T, 301/39 C, 40 S; 116/34 R, DIG. 27; 246/170, 171

[56] References Cited

U.S. PATENT DOCUMENTS

| 1,635,825 | 7/1927 | Eakin | 246/171 |
|---|---|---|---|
| 2,506,709 | 5/1950 | Donnelly | 246/171 |
| 2,536,914 | 1/1951 | Day | 246/170 |
| 2,856,539 | 10/1958 | Orthuber et al. | 246/170 |
| 3,672,308 | 6/1972 | Segar | 104/246 |
| 3,727,560 | 4/1973 | Blemly et al. | 104/247 |
| 3,915,503 | 10/1975 | Horton | 301/39 T |
| 4,090,452 | 5/1978 | Segar | 104/247 |

OTHER PUBLICATIONS

The Railway Gazzett "Detectors for Accident Prevention" p. 241, Oct. 2, 1959.

Primary Examiner—John J. Love
Assistant Examiner—Ross Weaver
Attorney, Agent, or Firm—R. G. Brodahl

[57] ABSTRACT

A rubber tired transportation vehicle for use in a mass transit system is provided with a disc member positioned adjacent to at least one vehicle support pneumatic tire operative with a condition sensing apparatus to detect the occurrence of a flat tire condition and to limit the vehicle axle drop in the event of a resulting loss of desired vehicle support because of that flat tire condition.

5 Claims, 2 Drawing Figures

TRANSPORTATION VEHICLE FLAT TIRE SAFETY APPARATUS

CROSS-REFERENCE TO RELATED APPLICATIONS

Reference is made to U.S. Pat. No. 4,089,272 by W. E. Schmitz and disclosing a transportation vehicle for use in a mass transit system operative with a vehicle restraining guide beam included with the vehicle roadway, for restraining the removal of the vehicle in relation to that roadway, the disclosure of which is incorporated herein by reference.

BACKGROUND OF THE INVENTION

It is known to provide a tansportation vehicle, as disclosed in U.S. Pat. No. 3,312,180 of E. O. Mueller and U.S. Pat. No. 3,672,308 of W. R. Segar for a mass transit system, with the vehicle being automatically controlled by a vehicle control system and self-steering along a roadway having spaced track surfaces and a centrally positioned vehicle restraining I-shaped guide member. The vehicle includes a guidance apparatus consisting of a plurality of guide wheels for each drive wheel axle and engaging and locking-on of the vehicle ot the I-shaped central guide member, as shown by an article published in the Westinghouse Engineer for July 1965 at pages 98 to 103 entitled "Transit Expressway—A New Mass Transit System". The guide wheels are coupled to each drive wheel axle housing, such that the axle with its associated drive wheels and the vehicle will be steered by the guide wheels as the vehicle moves along the roadway.

The transportation vehicles can utilize dual support tires as shown in above U.S. Pat. No. 3,312,180 to provide a redundant vehicle support mechanism and to prevent the immediate stoppage of a vehicle or a train of such vehicles caused by a flat or delfated tire. Even with dual support tires, a frequent inspection of same is required to detect loss of air from one of the dual tires which could eventually lead to a dual flat.

As shown by the above cross-referenced patent, it is known to provide the power collection rail apparatus above the central guide beam. Should a vehicle flat tire condition occur with the supported vehicle axle and other associated portions of the vehicle then dropping down closer to the top surface of that guide beam, an undesired disturbance and even physical damage to the power collection rail apparatus could result with an attendant lengthy shutdown of the transportation vehicle operation along the roadway and even the whole mass transit system.

SUMMARY OF THE INVENTION

A vehicle support disc member is provided in position adjacent to at least one inflated vehicle support tire, or between an associated pair of such tires, to provide desired support of the vehicle should a flat tire condition develop and to limit the physical dropping of the vehicle in relation to any power collection rail apparatus or other provided vehicle control apparatus that might be damaged if the vehicle drops below a predetermined and desired lowermost position limit, and is cooperative with flat tire detection apparatus provided to monitor the inflated condition of one or more of the vehicle support tires.

DESCRIPTION OF THE PREFERRED EMBODIMENT

Figure 1:
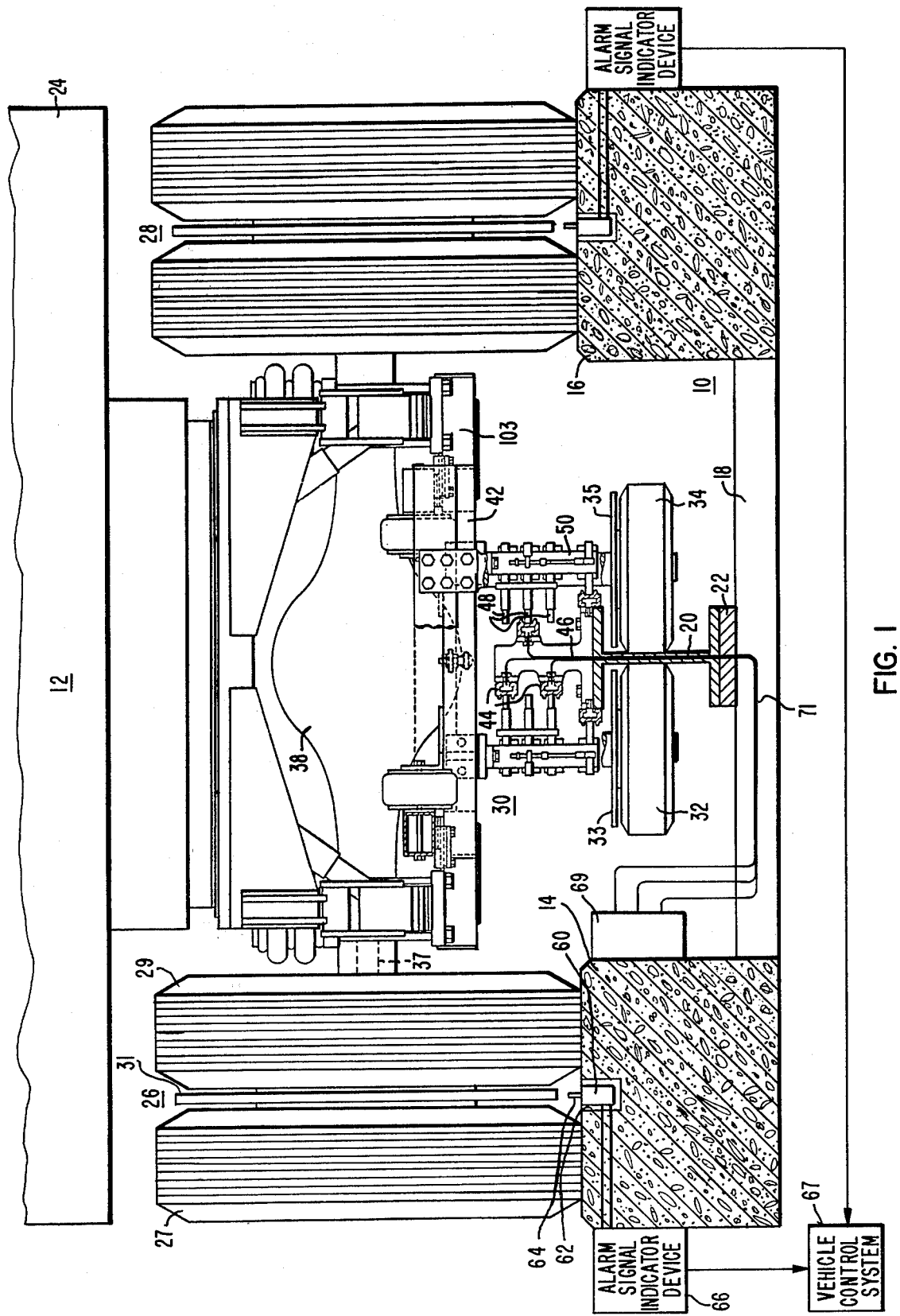
FIG. 1 shows a transverse section of a vehicle operative with a roadway including parallel track surfaces having a central guide beam therebetween, with the power rails and vehicle carried collectors positioned above the upper surface of the guide beam.

In FIG. 1 there is shown a roadway 10 for a mass transit vehicle 12 and including tracks 14 and 16 supported from a roadbed 18. A flanged guide beam 20 is positioned between the tracks 14 and 16 and supported by an element 22 between the roadbed 18 and the guide beam 20. The self-propelled vehicle 12 includes a body 24 and moves along the roadway tracks 14 and 16 on support wheels at each end of the car, such as support wheels 26 and 28, and is self-steering through operation of a guidance apparatus 30 including guide wheels 32 and 34. The wheels 26 and 28 are driven by an axle 37 within an axle housing 38. A set of four opposing guide wheels including the guide wheels 32 and 34 is provided for each set of support wheels 26 and 28 and operative with the guide beam 20 as shown. The guide wheels each rotate about a vertical axle, with the upper ends of those vertical axles being fixed to the vehicle steering member 42. Each guide wheel includes a pneumatic tire pressed against the guide beam 20 to produce a preloading force. The guide beam 20 transmits lateral vehicle forces, such as vehicle centrifugal and steering forces to the roadbed 18. The guide beam top flange restrains and prevents the vehicle 12 from leaving the roadway 10.

The vehicle 12 is driven by an electric motor operative with the axle 37 within the axle housing 38, with one such motor being provided for each axle housing. Electric power is supplied to the vehicle by the energized power rails 44 supported by insulated member 46 above the guide beam, and cooperative with power collectors 48 supported by the vehicle carried arm 50.

In one particular embodiment of the present mass transit system, the guide beam 20 has a height of 12.5 inches, the guide wheels 32 and 34 extend below the guide wheel support member 42 a distance of 12 inches, the guide wheel normal unloaded diameter is 16.3 inches, the associated metal safety discs 33 and 35 have a diameter of 14.5 inches and the running wheels 26 and 28 include pneumatic rubber tires of 8:25-20 size. An article published in the Westinghouse Engineer for January 1969 at pages 9 to 15 disclosed a similar configuration of the guide beam and the roadway tracks.

The dual tires 27 and 29 of the support wheel set 26 include a cast or fabricated disc 31 located between the set of dual tires 27 and 29. The diameter of the disc 31 is slightly smaller than the normally inflated rolling diameter of the main support tires 27 and 29, such that deflation of one of the dual tires 27 and 29 will physically drop the peripheral surface of the disc 31 closer to the upper surface of the roadway track 14. If both of the tires 27 and 29 should become deflated for some reason such as puncturing, the peripheral surface of the disc 31 will drop until it comes into contact with the upper surface of the roadway track 14 and thereby support the weight associated with the vehicle 12 that is normally carried by the pneumatic tires 27 and 29 and without the lowermost portions of the vehicle 12 further dropping closer to the upper surface of the roadway track. The diameter of the disc 31 is empirically determined to be large enough when the outer periphery of the disc 31 is in contact with the upper surface of the roadway track 14, to maintain the physical position of the lowermost portion of the vehicle above the power rails 44 and support member 46, such as the vehicle steering member 42 sufficiently above the insulated support member 46 and the other operationally required clearances between the various parts of the power collection apparatus as shown in FIG. 1.

A detector switch 60 is provided in a box 62 embedded into the roadway track 14, with the detector switch 60 including an actuating arm 64 extending above the upper surface of the roadway track 14 and in alignment with the movement path of the disc 31 associated with the support wheel set 26 and any similar disc associated with each additional set of dual support wheels that may be operative with the vehicle 12 or other similar vehicles that travel along the roadway track 14. When a vehicle with a single flat tire or a dual flat tire condition is rolled or driven over the actuating arm 64, the disc 31 will deflect the arm 64 to operate the detector switch and cause the alarm signal device 66 connected with the detector switch 60 to provide an output alarm signal to a suitable wayside alarm signal indicator device 66 which can ring a bell or flash a light or transmit a flat tire condition indicator signal to a centrally located vehicle control system 67 for controlling the mass transit system as may be desired. It may even be desired that the flat tire condition indication signal be sent to the vehicle 12 passing over the switch 60 so that appropriate corrective action on the vehicle can be taken.

The power rails 44 are energized by a suitable power supply 69 coupled with the power rails 44 through a suitable three phase connection 71, which can pass through a gap between respective ends of the sections of the guide beam 20, small enough for the conductor 71 to pass but not large enough to affect the operation of the guide wheels 32 and 34.

Figure 2:
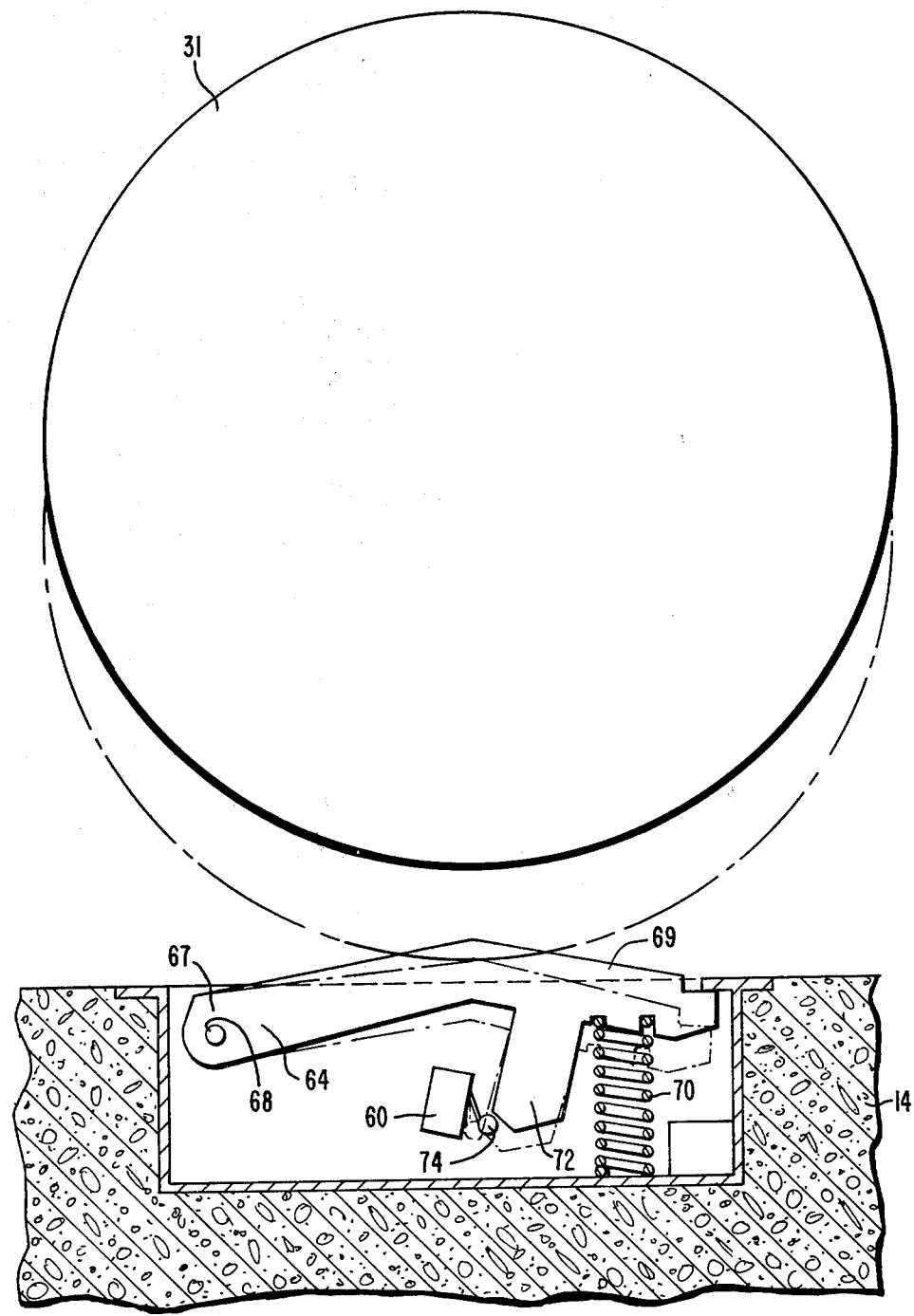
FIG. 2 shows a side view of the flat tire detection apparatus positioned below one of both of the track surfaces and including a detector arm cooperative with the disc members of at least one vehicle support tire arrangement.

In FIG. 2 there is shown a side view of the vehicle support disc 31 in an upper normal position above and out of contact with the detector arm 64 of the detector switch 60. The detector arm 64 is supported at one end 67 by pivot 68 and is lifted upward at the opposite end 69 by the support spring member 70. The arm 64 includes an extension 72 which is coupled with the operating lever 74 of the detector switch 60. When the vehicle support disc 31 drops down in position because of at least one of the main support wheels 27 and 29 becoming deflated, the disc 31 pushes down on the arm 64 to lower the extension 72 as shown in dotted lines and to operate the detector switch 60 to provide an alarm signal to indicate that an undesired tire deflation condition exists as indicated by the lowered position of the support disc 31 to its lower position shown in dotted lines. The arm 64 is shaped such that the transit vehicle can travel in either direction over the roadway track and the flat tire condition detection apparatus will perform as required. The support disc 31 should have a width greater than the arm 64 such that support for the vehicle 12 is provided by the upper surface of the track 14 even when the disc 31 is forcing down the arm 64 and this could prevent possible damage to the arm 64 and associated alarm signal providing apparatus.

The alarm signal indicator device 66 is provided at the wayside of the vehicle roadway 10, for the advantage over a vehicle carried flat tire condition detection apparatus that the provided alarm signal is already on the wayside for easier resulting control of the involved vehicle as compared to being generated on board the vehicle and then have to be communicated to the wayside for desired control of the involved vehicle and perhaps other vehicles of the mass transit system.

I claim:

1. In protection apparatus for a mass transit vehicle having support wheels operative with a roadway including spaced track surfaces and a vehicle restraining guide beam located between said track surfaces, said vehicle including at least one set of support wheels for traveling along one of said track surfaces and having guide wheels operative with said guide beam, the combination of:

vehicle support means positioned between said one set of support wheels to travel along a movement path determined by said guide wheels, said vehicle support means normally being spaced a predetermined distance above the track surface along which said one set of support wheels travels, wheel condition sensing means coupled with said one track surface and positioned to extend above said one track surface in alignment with the movement path of the vehicle support means for determining the condition of said support wheels by sensing the vertical position of the vehicle support means traveling along said roadway track surface, and signal providing means coupled with said sensing means and responsive to the vertical position of said vehicle support means to provide an alarm signal when the vehicle support means moves in position below said predetermined distance to come in contact with said wheel condition sensing means.

2. The protection apparatus for a mass transit vehicle of claim 1, with a plurality of wheel condition sensing means being provided and a different one of said wheel condition sensing means being coupled with each said track surface for providing a wayside indication of the condition of the support wheels operative with that track surface.

3. The protection apparatus of claim 1 for a mass transit vehicle having a plurality of sets of support wheels with said vehicle support means including a disc member positioned between each set of vehicle support wheels and having a diameter smaller than the inflated diameter of the associated set of vehicle support wheels.

4. In protection apparatus for a mass transit vehicle having a support axle at each end of the vehicle and a pair of support wheels at each side of the vehicle and at the respective ends of each axle, with said support wheels being operative with a roadway including first and second spaced track surfaces and a guide beam centrally positioned between said track surfaces and vehicle power collection rails located above said guide beam, the combination of:

a vehicle support disc member positioned between each pair of support wheels and having a diameter in relation to the inflated diameter of the associated pair of support wheels such that when the associated support wheels become deflated, the disc member will drop in position and maintain the lowermost portion of the vehicle a predetermined distance above the power collection rails, first wheel deflation sensing means coupled with the first track surface and located in alignment with the movement path of the vehicle support disc members associated with said first track surface, second wheel deflation sensing means coupled with the second track surface and located in alignment with the movement path of the vehicle support disc members associated with said second track surface, and alarm signal indicator means coupled with the first and second wheel deflation sensing means to provide an alarm signal when a support wheel deflation condition drops one of said vehicle support disc members and is sensed by one of the first and second wheel deflation sensing means.

5. The protection apparatus of claim 4, with each of the first and second wheel deflation sensing means including an actuating arm extending above the coupled track surface and having a width less than each vehicle support disc member such that the track surface provides support for the vehicle when the support wheels associated with that disc member becomes deflated to lower the position of that disc member.

* * * * *